(12) United States Patent
Bauchet et al.

(10) Patent No.: US 8,906,502 B2
(45) Date of Patent: Dec. 9, 2014

(54) ORGANIC POWDER USEFUL AS THE REPLACEMENT OF MINERAL FILLER IN COMPOSITES

(75) Inventors: Frederic Bauchet, Liberty, MO (US); Valerie Englert, Liberty, MO (US)

(73) Assignee: CCP Composites US LLC, North Kansas City, MO (US)

( * ) Notice: Subject to any disclaimer, the term of this patent is extended or adjusted under 35 U.S.C. 154(b) by 396 days.

(21) Appl. No.: 11/876,046

(22) Filed: Oct. 22, 2007

(65) Prior Publication Data

US 2008/0160307 A1   Jul. 3, 2008

Related U.S. Application Data

(60) Provisional application No. 60/882,649, filed on Dec. 29, 2006, provisional application No. 60/979,590, filed on Oct. 12, 2007.

(51) Int. Cl.
*C08L 31/02* (2006.01)
*C09D 7/12* (2006.01)
*C08K 11/00* (2006.01)

(52) U.S. Cl.
CPC .............. *C09D 7/125* (2013.01); *C08K 11/00* (2013.01); *C09D 7/1275* (2013.01); *C09D 7/1283* (2013.01)
USPC ............................ 428/402; 428/403; 525/221

(58) Field of Classification Search
USPC .................................. 428/402, 403
See application file for complete search history.

(56) References Cited

U.S. PATENT DOCUMENTS

| | | | |
|---|---|---|---|
| 4,587,323 A | | 5/1986 | Toman |
| 5,102,764 A | * | 4/1992 | Rossi et al. .............. 430/108.21 |
| 5,177,127 A | * | 1/1993 | Raju .............................. 523/500 |
| 5,244,941 A | * | 9/1993 | Bruckbauer et al. .......... 523/171 |
| 5,476,895 A | | 12/1995 | Ghahary |
| 5,504,126 A | | 4/1996 | Ghahary |
| 6,472,069 B1 | * | 10/2002 | Bailey et al. .................. 428/417 |
| 2003/0114622 A1 | * | 6/2003 | Masawaki ...................... 526/318 |
| 2004/0023050 A1 | * | 2/2004 | Kia et al. ....................... 428/480 |
| 2005/0049330 A1 | * | 3/2005 | McFaddin ..................... 523/223 |
| 2009/0137728 A1 | * | 5/2009 | Sumner et al. ................ 524/563 |

FOREIGN PATENT DOCUMENTS

| | | | |
|---|---|---|---|
| EP | 1138469 | * | 10/2001 |
| EP | 1707594 | | 10/2006 |
| JP | 55115445 | * | 9/1980 |
| JP | 2-102156 | | 4/1990 |
| JP | 6-025539 | | 2/1994 |
| JP | 2003002995 | | 8/2003 |

OTHER PUBLICATIONS

English Abstract of JP 55115445 (1980).*
English Abstract of JP 2003-002995, Tanazawa et al., Jan. 2003.*

* cited by examiner

*Primary Examiner* — Ronak Patel
(74) *Attorney, Agent, or Firm* — Whyte Hirschboeck Dudek S.C.

(57) ABSTRACT

This invention is about organic powder materials useful as the replacement of mineral or inorganic fillers in composites. The organic powder materials have particle size less than 60 μm and are visually non-differentiable in composites. The gel coat materials with the organic powder have uniform color appearance and have improved color stability when exposed to moisture.

14 Claims, No Drawings ial is from 50/50 to 100/0 by weight. The maximum particle
ORGANIC POWDER USEFUL AS THE REPLACEMENT OF MINERAL FILLER IN COMPOSITES

CROSS-REFERENCE TO RELATED APPLICATIONS

This application claims the benefit of U.S. Provisional Patent Application No. 60/882,649 entitled "Organic Powder Useful as the Replacement of Mineral Filler in Composites" filed on Dec. 29, 2006; and U.S. Provisional Patent Application No. 60/979,590 entitled "Organic Powder Useful as the Replacement of Mineral Filler in Composites" filed on Oct. 12, 2007, both of which are hereby incorporated by reference herein.

FIELD OF THE INVENTION

The present invention is in the field of gel coats, more particularly, gel coat compositions with an organic powder filler material and articles coated with such gel coats.

BACKGROUND OF THE INVENTION

Gel coated composite articles are commonly used in a wide variety of applications. Gel coats provide improved weathering characteristics and surface appearance. In some applications, e.g., countertops and bathroom fixtures, the composite article preferably simulates the appearance of natural materials such as granite, marble or other stone. A number of methods are known to produce the simulated stone appearance.

U.S. Pat. No. 5,504,126 described a simulated mineral article comprises a discrete suspended plastic material and a continuous thermoplastic matrix. The plastic material and the thermoplastic matrix are visually distinguishable from each other and each contains a coupling agent. The patent also provides a method of preparing a simulated mineral article which entails preparing a liquid thermoplastic to serve as a matrix and then suspending a plastic material therein. The plastic material is composed of a thermoset plastic made from resin which comprises an acid component having thermoplastic characteristics.

U.S. Pat. No. 5,476,895 describes a sprayable coating composition that is useful for forming a simulated granite surface having high-impact strength, superior hardness and an aesthetically-pleasing look. The coating composition has a gel coat and granules which include thermoplastic and thermoset plastic components. The gel coat and granules are visually differentiable from each other, substantially immiscible and substantially isopycnic in density. The composition, when combined with a hardener, may be sprayed into a mold and backed with fiber glass, plastic or other suitable resin to form a panel or similar structure, or may be directly applied to a surface to provide a simulated-granite appearance.

Japan patent 02-102156 described a hot press molding resin composition to improve transparency and gloss by hot-pressing a molding composition containing an unsaturated polyester resin, curing agent, cured product powder of an unsaturated polyester resin, specific inorganic filler and mold releasing agent.

Japan patent 06-25539 described colored resin particles for decorated moldings. The colored resin particles were obtained by dissolving the thermoplastic resin, in uncured thermosetting resin. Filler and pigment were then added into the resin solution and the resin solution was cured and crushed into small pieces.

SUMMARY OF THE INVENTION

In one embodiment, the invention is an organic filler useful as the replacement of mineral fillers in gel coats and other type of composites materials, the organic filler comprising from about 50 to 100 wt %, based on the total weight of the filler, of an organic material that comprises at least one of: (a) the reaction products of unsaturated polyester resins, unsaturated polyester/polyurethane hybrid resins, cross-linkable acrylics, melamine, or (b) thermoplastic polymers that are neither soluble in, nor swell in, ethylenically unsaturated monomers.

In another embodiment, the invention is a gel coat composition comprising an organic filler, the organic filler comprising from about 50 to 100 wt %, based on the total weight of the filler, of an organic material that comprises at least one of: (a) the reaction products of unsaturated polyester resins, unsaturated polyester/polyurethane hybrid resins, cross-linkable acrylics, melamine, or (b) thermoplastic polymers that are neither soluble in, nor swell in, ethylenically unsaturated monomers.

DETAILED DESCRIPTIONS OF THE INVENTION

The invention is about powder materials useful as the replacement of mineral fillers, such as aluminum trihydrate, barium sulfate, calcium carbonate, talc, clay, etc., in gel coats, and other type of composites materials. The mineral filler can be entirely or partially replaced by the powder material in the application. The powder materials are made from organic materials or combination of cured organic and inorganic materials. The amount of organic material to inorganic material is from 50/50 to 100/0 by weight. The maximum particle size of the powder materials is less than 60 μm. The particle size of the organic filler has a typical range of 0.1 to 45 μm, and is visually non-differentiable when incorporated into the composites.

The organic materials used to make the organic powders are the reaction products of unsaturated polyester resins, unsaturated polyester/polyurethane hybrid resins, cross-linkable acrylics, and melamine, or thermoplastic polymers that do not dissolve or swell in ethylenically unsaturated monomers. The organic materials have glass transition temperature above 50° C., preferably above 60° C. The reaction products have a degree of cure (conversion) above 70%, preferably above 80%. The reaction products have less than 10 wt % volatile content, preferably less than 5% volatile content.

The unsaturated polyester resin has at least one dicarboxylic alkene moiety and is preferably an oligomer of an α,β-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester resin can also be prepared from unsaturated di- or polycarboxylic acid(s) or anhydride(s) with glycols and/or polyhydric alcohol(s). Examples of suitable saturated di- or polycarboxylic acids include isophthalic, orthophthalic, terephthalic, adipic, succinic, sebacic acid and mixtures of two or more of these compounds with isophthalic acid being preferred. Typical unsaturated carboxylic acids or anhydrides include maleic acid, fumaric acid, citraconic acid, chloromaleic acid, allyl succinic acid, itaconic acid, mesaconic acid, their anhydrides and mixtures of two or more such compounds, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol and mixtures of two or more of such compounds. The production of such resins is well-known to those skilled in the art and, additionally, many suitable resins are commercially available from resin manufacturers, such as Cook Composites & Polymers Company.

The unsaturated polyester resin solution also contains ethylenically unsaturated monomer. The ethylenically unsaturated monomer can be any ethylenically unsaturated monomer capable of crosslinking the unsaturated polyester resin via vinyl addition polymerization.

Examples of useful ethylenically unsaturated monomers are styrene, o-, m-, p-methyl styrene, methyl acrylate, methyl methacrylate, t-butylstyrene, divinyl benzene, diallyl phthalate, triallyl cyanurate and mixtures of two or more unsaturated monomers. The preferred monomer is styrene because it provides an economical monomer solution.

The reaction products are made through the typical curing processes of thermosetting resins. The typical curing process of thermosetting resin comprises adding initiators and promoters to a resin or resin solution and (i) curing at ambient temperature, (ii) heating the material to elevated temperature to cure the resin, (iii) curing by exposing the resin to UV light, or (iv) curing by exposing the resin to microwave. The cured materials can be post-cured at elevated temperature to further increase the degree of cure and removal of the volatile materials. The cured organic materials then went through a size reduction process to obtain the final powder product with proper size range. The traditional size reduction process includes ball mill, cryogenic grinding, hammer mill, jet mill, roller mill, etc.

The initiators useful in producing the cured resin compositions of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiarybutyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate. Promoters can also be used in combination with vinyl polymerization peroxide catalysts to control the rate of free radical initiation. A common benzoyl peroxide promoter is N,N-diethylaniline.

Gel coat compositions can be formulated with the organic powder of this invention in the usual method. Gel coat compositions include pigment, promoters, catalysts, stabilizers, extenders, and the like as practiced in the art. The amount of organic powder material in gel coat is at least about 2 wt %, preferably from about 2 wt % to about 50 wt %, more preferably from about 10 wt % to about 50 wt % of total gel coat formula. The gel coat materials with the organic powder have uniform color appearance and have improved color stability when exposed to moisture.

The following examples illustrate the preparation of organic fillers and gel coats with the organic filler.

EXAMPLE 1

1.5 wt % initiators (TBPB) was added into an unsaturated polyester resin containing 60 wt % PG/NPG/IPA/MA (propylene glycol/neopentyl glycol/isophthalic acid/maleic anhydride) type resin solid and 40 wt % styrene monomer. The resin used was a base resin in CCP STYPOL brand gel coats. The resin solution was poured into metal mold at 150° C. and cured for 3 minutes. The cured resin was then broken into small pieces about 1 square inches. The pieces were then grinded to powder with the maximum particle size of 45 μm with a hammer mill.

EXAMPLE 2

0.15% of 6% cobalt and 1.5 wt % initiators methyl ethyl Ketone peroxide (MEKP) was added into an unsaturated polyester resin containing 60 wt % PG/NPG/IPA/MA type resin solid and 40 wt % styrene monomer (the same resin as used in Example 1). The resin solution was poured into a metal mold at ambient temperature and cured for 12 hours. The cured resin was then post-cured at 65° C. for 24 hours and broken into small pieces about 1 square inches. The pieces were then grinded to powder with the maximum particle size of 45 μm with a hammer mill.

EXAMPLE 3

A gel coat composition is then prepared by blending the following ingredients:

| Component | Weight Percent |
|---|---|
| Unsaturated Polyester Resin (same resin as Example 1) | 53.6 |
| Organic Fillers from Ex. 1 | 25.0 |
| Fumed Silica | 1.5 |
| Monomer | 19.0 |
| Air Release | 0.5 |
| 12% Cobalt | 0.2 |
| Ethylene Glycol | 0.2 |

EXAMPLE 4

A gel coat composition is then prepared by blending the following ingredients:

| Component | Weight Percent |
|---|---|
| Unsaturated Polyester Resin (same resin as Example 1) | 53.6 |
| Organic Fillers from Ex. 2 | 25.0 |
| Fumed Silica | 1.5 |
| Monomer | 19.0 |
| Air Release | 0.5 |
| 12% Cobalt | 0.2 |
| Ethylene Glycol | 0.2 |

EXAMPLE 5

A low VOC gel coat composition is then prepared by blending the following ingredients:

| Component | Weight Percent |
|---|---|
| Unsaturated Polyester Resin (same resin as Example 1) | 53.6 |
| Mineral Fillers | 25.0 |
| Fumed Silica | 1.5 |
| Monomer | 19.0 |
| Air Release | 0.5 |

| Component | Weight Percent |
| --- | --- |
| 12% Cobalt | 0.2 |
| Ethylene Glycol | 0.2 |

The gel coat from Example 3 was very stable in that it did not gel after three months storage. The gel coat of Example 4 was not stable in that it gelled within one week.

EXAMPLES 6 AND 7

Pigmented gel coat compositions were prepared by adding 7.5 wt % black pigment paste into the gel coat composition shown in Examples 3 and 5:

TABLE 4

| Example 6 | Example 7 |
| --- | --- |
| Gel coat from Example 3: 92.5 wt % | Gel coat from example 5: 92.5 wt % |
| Black pigment paste: 7.5% | Black pigment paste: 7.5% |

The resulting gel coats had a Brookfield viscosity of 18000-20000 cps at 4 rpm at 77° C. and a thixotropic index of 5.0-7.0. 1.8% methyl ethyl ketone peroxide (MEKP) is used to cure the gel coat. The gel time is around 15 minutes and cure time is around 60 minutes. Two gel coated laminates were prepared by spraying the catalyzed gel coat onto a mold and letting the gel coat cure at the ambient temperature for about one hour. The laminate was then put on the gel coat to about 3.5 mm in thickness. The color of cured gel coat was measured by a spectrophotometer. Part of the gel coated surface was sanded and buffed (known as "buff back"), and the color difference before and after buff back was also compared with the spectrophotometer. Table 5 shows the color difference of cured gel coat from examples 6 and 7. The results indicated the color difference before and after buff back were much smaller for the gel coat sample from Example 6.

TABLE 5

| Color Difference | Example 6 | Example 7 |
| --- | --- | --- |
| DE | 0.93 | 4.09 |
| DL | 0.91 | 3.90 |
| Da | −0.16 | −0.07 |
| Db | 0.08 | −1.24 |

EXAMPLE 8 COMPARISON OF 100 HOURS WATER BOIL OF LAMINATES

The gel-coated laminates were prepared with the gel coat samples from examples 6 and 7. The laminates had the cured gel coat thickness around 15 mils. The panels were immersed in boiling de-ionized water for 100 hours, and the color difference before and after boil test was measured by a spectrophotometer. The results indicated the gel coat sample from Example 6 has much less color change compared to the gel coat sample from Example 7.

TABLE 6

| Color Difference | Example 6 | Example 7 |
| --- | --- | --- |
| DE | 5.11 | 12.19 |
| DL | 5.09 | 12.18 |
| Da | 0.07 | −0.32 |
| Db | −0.48 | −0.47 |

EXAMPLES 9 TO 11 PREPARATION OF GEL COAT WITH LOW VOC GEL COAT RESIN

A low VOC type unsaturated polyester resin having the viscosity around 500 cps at 70% NVM in styrene was used to prepare the gel coat samples. Gel coat samples with different level of filler were prepared by blending the ingredients listed in Table 7.

TABLE 7

| | Example 9 | Example 10 | Example 11 |
| --- | --- | --- | --- |
| Low VOC Gel Coat Resin | 72.3 | 70.0 | 67.8 |
| Organic Filler from Ex. 1 | 4.5 | 6.8 | 9.0 |
| Fumed Silica | 2.0 | 2.0 | 2.0 |
| Monomer | 10.3 | 10.3 | 10.3 |
| Air Release | 0.5 | 0.5 | 0.5 |
| 12% Cobalt | 0.2 | 0.2 | 0.2 |
| Ethylene Glycol | 0.2 | 0.2 | 0.2 |
| Pigment Paste | 10.0 | 10.0 | 10.0 |

The resulting gel coat samples had a Brook field viscosity of 8000-14000 cps at 4 rpm at 77° C. and a thixotropic index of 4.0-6.5. The gel coats were then initiated with 1.8% methyl ethyl ketone peroxide (MEKP) and sprayed onto glass mold with various thicknesses. The gel coats had gel time around 15 minutes and cure time around 60 minutes. The cured gel coat films were then check for the porosity. Cured gel coat films of examples 9 to 11 showed porosity at the gel coat thickness around 15, 27, and 40 mils.

What is claimed is:

1. An organic powder filler comprising from about 50 to 100 wt %, based on the total weight of the filler, of an organic material having a glass transition temperature above 50° C. and comprising a cured or crosslinked reaction product of at least selected from the group consisting of an unsaturated polyester resin, unsaturated polyester/polyurethane hybrid resin, cross-linkable acrylic, melamine, and a thermoplastic polymer that is neither soluble in, nor swells in, ethylenically unsaturated monomers,
   wherein the cured or crosslinked reaction product has less than 10 wt % volatile content and a degree of cure above 70%, and
   the organic powder filler is in the form of particles having a maximum particle size less than 60 µm.

2. The organic powder filler of claim 1, wherein the particle size is in the range of about 0.1 to about 45 µm.

3. The organic powder filler of claim 1, wherein the particles are visually non-differentiable from a composite matrix when the particles are incorporated into composites.

4. The organic powder filler of claim 1, wherein the organic material has a glass transition temperature above 60° C.

5. The organic powder filler of claim 1, wherein the cured or crosslinked reaction product has a degree of cure above 80%.

6. The organic powder filler of claim 1, wherein the cured or crosslinked reaction product has less than 5% volatile content.

7. The organic powder filler of claim 1, wherein the reaction product is produced by adding an initiator and promoter to the unsaturated polyester resin, unsaturated polyester/polyurethane hybrid resin, cross-linkable acrylic, or melamine to form a curable mixture, and curing the curable mixture by curing at ambient temperature, heating the mixture, exposing the mixture to UV light, or exposing the mixture to microwave; and the cured mixture is reduced in size to form the particles of the organic powder filler.

8. The organic powder filler of claim 7, wherein the reaction product is further post-cured at an elevated temperature to increase the degree of cure and reduce the volatile content.

9. A gel coat composition comprising an organic powder filler comprising about 50 to 100 wt % of an organic material, based on the total weight of filler in the gel coat composition, the organic material having a glass transition temperature above 50° C. and comprising a cured or crosslinked reaction product of at least selected from the group consisting of an unsaturated polyester resin, unsaturated polyester/polyurethane hybrid resin, cross-linkable acrylic, melamine, and a thermoplastic polymer that is neither soluble in, nor swells in, ethylenically unsaturated monomers, wherein the organic powder filler is in the form of particles having a maximum particle size less than 60 μm and present in an amount from about 10 to about 50 wt %, based on the total weight of the gel coat composition.

10. The gel coat composition of claim 9, wherein the particles are visually non-differentiable from the gel coat.

11. The gel coat composition of claim 9, further comprising reactive ethylenically unsaturated monomers.

12. The gel coat composition of claim 9, wherein the gel coat composition has a HAP value less than 37 wt %.

13. A gel coat obtained by curing the gel coat composition of claim 9.

14. An article comprising the gel coat of claim 13.

* * * * *